United States Patent
Galvanauskas et al.

(10) Patent No.: US 6,744,555 B2
(45) Date of Patent: Jun. 1, 2004

(54) ULTRASHORT-PULSE SOURCE WITH CONTROLLABLE WAVELENGTH OUTPUT

(75) Inventors: Almantas Galvanauskas, Ann Arbor, MI (US); Mark A. Arbore, Palo Alto, CA (US); Martin M. Fejer, Menlo Park, CA (US); Donald J. Harter, Ann Arbor, MI (US)

(73) Assignees: IMRA America, Inc., Ann Arbor, MI (US); Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/042,666

(22) Filed: Mar. 17, 1998

(65) Prior Publication Data

US 2004/0075883 A1 Apr. 22, 2004

Related U.S. Application Data

(63) Continuation-in-part of application No. 08/975,679, filed on Nov. 21, 1997.

(51) Int. Cl.[7] .......................... G02F 1/365; G02F 1/377
(52) U.S. Cl. .......................... 359/332; 372/22; 385/122
(58) Field of Search ............................... 359/326–332; 372/21–22; 385/122

(56) References Cited

U.S. PATENT DOCUMENTS

| | | | | |
|---|---|---|---|---|
| 4,784,450 A | * | 11/1988 | Jain et al. | 359/332 |
| 4,853,933 A | * | 8/1989 | Blow et al. | 359/327 X |
| 4,958,910 A | * | 9/1990 | Taylor et al. | 359/327 |
| 5,013,115 A | * | 5/1991 | Kashyap | 359/328 |
| 5,224,193 A | * | 6/1993 | Risk | 385/122 |
| 5,321,707 A | * | 6/1994 | Huber | 385/122 X |
| 5,557,699 A | * | 9/1996 | Kester et al. | 385/122 |
| 5,574,818 A | * | 11/1996 | Krivoshlykov | 385/122 |
| 5,615,041 A | * | 3/1997 | Field et al. | 359/326 |
| 5,815,307 A | * | 9/1998 | Arbore et al. | 359/328 |
| 5,862,287 A | * | 1/1999 | Stock et al. | 359/332 X |
| 5,912,910 A | * | 6/1999 | Sanders et al. | 372/22 |
| 6,154,310 A | * | 11/2000 | Galvanauskas et al. | 359/328 |

* cited by examiner

Primary Examiner—John D. Lee
(74) Attorney, Agent, or Firm—Sughrue Mion, PLLC

(57) ABSTRACT

A multiple-wavelength ultrashort-pulse laser system includes a laser generator producing ultrashort pulses at a fixed wavelength, and at least one and preferably a plurality of wavelength-conversion channels. Preferably, a fiber laser system is used for generating single-wavelength, ultrashort pulses. An optical split switch matrix directs the pulses from the laser generator into at least one of the wavelength conversion channels. An optical combining switch matrix is disposed downstream of the wavelength-conversion channels and combines outputs from separate wavelength-conversion channels into a single output channel. Preferably, waveguides formed in a ferroelectric substrate by titanium indiffusion (TI) and/or proton exchange (PE) form the wavelength-conversion channels and the splitting and combining matrices. Use of the waveguide allows efficient optical parametric generation to occur in the wavelength-conversion channels at pulse energies achievable with a mode-locked laser source. The multiple-wavelength laser system can replace a plurality of different, single-wavelength laser systems. In its simplest form, the system can be used to convert the laser wavelength to a more favorable wavelength. For example, pulses generated at 1.55 μm by a mode-locked erbium fiber laser can be converted to 1.3 μm for use in optical coherence tomography or to wavelengths suitable for use in a display, printing or machining system.

34 Claims, 12 Drawing Sheets

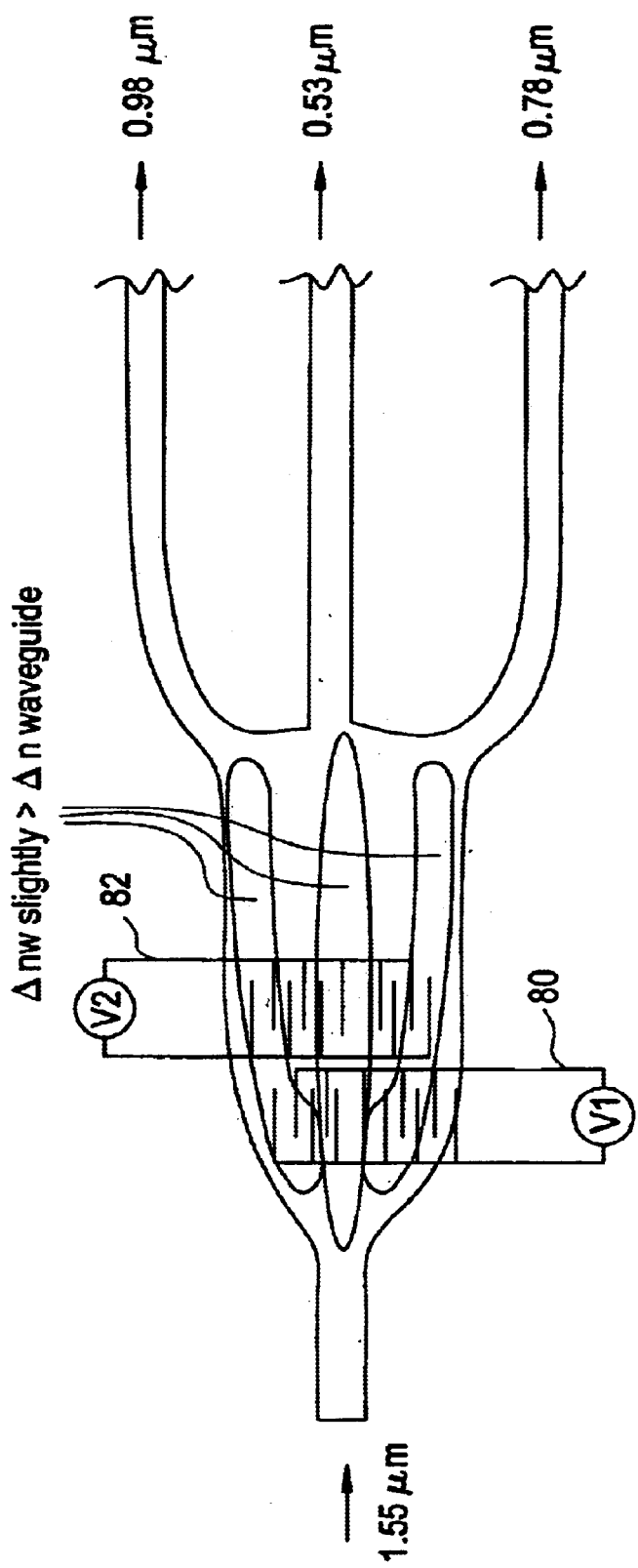

ULTRASHORT-PULSE SOURCE WITH CONTROLLABLE WAVELENGTH OUTPUT

REFERENCE TO RELATED APPLICATION

This is a Continuation-in-Part of U.S. application Ser. No. 08/975,679, filed Nov. 21, 1997.

BACKGROUND OF THE INVENTION

1. Field of the Invention

The present invention generally relates to an apparatus and method for generating ultrashort optical pulses at a plurality of optical wavelengths, and, more particularly, to an apparatus and method using optical fibers and optical waveguides to produce and control such optical pulses. Ultrashort is here generally referred to as being within the time scale of approximately $10^{-15}$ seconds (femtoseconds) to $10^{-12}$ seconds (picoseconds).

2. Description of the Related Art

A variety of laser systems for producing ultrashort optical pulses is known in the prior art. From a practical point of view, these systems can be generally grouped into two main categories: solid-state laser systems, which are based on the use of volume laser gain media, and fiber laser systems, which are based on waveguiding fiber-optic components. Due to their intrinsic structure, fiber lasers have a number of basic properties which make them significantly more suitable for widespread practical use. As is well known in the prior art, fiber lasers are compact, can be diode pumped, and are robust and reliable. For a number of reasons, at present, the most mature technology suitable for ultrashort-pulse fiber laser systems is based on Er-doped fiber providing output pulses having a wavelength of approximately 1.55 $\mu$m. First, Er-doped fibers are among the best developed of the rare-earth-doped fibers. Diode lasers for pumping such fibers are also well advanced.

Significantly, the generation of ultrashort pulses requires design-control of the dispersion in the laser cavity. This can be accomplished in a compact, all-fiber cavity only at wavelengths above 1.3 $\mu$m, where the dispersion of the optical fiber can be tailored to be either of positive or negative sign. However, a variety of practical applications for ultrashort pulses require other wavelengths of operation, for example, either at shorter or longer wavelengths. At those wavelengths, femtosecond-pulse fiber oscillators at present can be designed only by using bulky external components, such as sets of prism pairs, to control the in-cavity dispersion.

The general and well known method to extend the wavelength range of any particular laser system is to utilize nonlinear optical interactions, such as optical harmonic generation, sum or difference frequency generation and optical parametric gain.

Harmonic generation is suitable only for converting an optical signal to a higher optical frequency (shorter wavelength) and it cannot provide tunable or multiple-wavelength output. Sum-frequency and difference-frequency generation allows conversion of a signal to both higher and lower optical frequencies and allows wavelength tunability, but requires at least two well synchronized optical sources at two different optical frequencies. Therefore, each of these interactions alone cannot provide multiple-wavelength or wavelength-tunable output from one, single-wavelength signal source.

Optical parametric interaction is suitable for providing tunable or multiple-wavelength conversion using one, single-wavelength optical signal source. Furthermore, while optical parametric conversion allows conversion of an optical signal only to a lower optical frequency (longer wavelength), by combining parametric interaction with at least one of the above described interactions, any optical frequency above or below the signal-source frequency can be obtained.

The general drawback of parametric optical frequency conversion is that, in order to achieve high parametric gain sufficient to amplify spontaneous quantum-fluctuation noise from microscopic to macroscopic levels and, consequently, to achieve efficient signal-energy conversion, high peak-powers and high pulse-energies are required. It is well known from the prior art that the required energies are well above the energies that can be generated directly from a typical mode-locked, ultrashort-pulse laser oscillator. The best demonstrated result known to date is an optical parametric generation (OPG) threshold at ~50 nJ, and efficient OPG conversion of ~40% at approximately 100 nJ achieved in bulk periodically-poled lithium-niobate crystals, as reported by Galvanauskas et al. in "Fiber-laser-based femtosecond parametric generator in bulk periodically poled LiNbO$_3$"; Optics Letters, Vol. 22, No. 2; January, 1997. In comparison, typical femtosecond mode-locked pulse energies from a fiber laser are in the range of 10 pJ to 10 nJ (as described by Fermann et al. in "Environmentally stable Kerr-type mode-locked erbium fiber laser producing 360-fs pulses"; Optics Letters; Vol. 19, No. 1; January, 1997, and by Fermann et al. in "Generation of 10 nJ picosecond pulses from a modelocked fibre laser"; Electronics Letters, Vol. 31, No. 3; February, 1995) and those from a solid-state laser are in the range of up to ~30 nJ (as described by Pelouch et al. in "Ti:sapphire-pumped, high-repetition-rate femtosecond optical parametric oscillator"; Optics Letters, Vol. 17, No. 15; August, 1992).

It is known from the prior art that efficient optical parametric wavelength conversion can be achieved with unamplified or amplified mode-locked laser pulses by arranging a nonlinear crystal in a separate optical cavity in a manner that ensures that pump pulses and signal pulses pass the parametric gain medium synchronously, as seen, for example in the above-referenced article by Pelouch et al. Since, in this case, parametric interaction occurs repetitively, the low, single-pass parametric gain and, consequently, low pulse energies of mode-locked oscillators are sufficient to achieve efficient conversion. The significant practical drawback of this approach is that such a scheme requires two precisely length-matched optical cavities; one for a mode-locked oscillator and another a for synchronously-pumped optical parametric oscillator (OPO). Consequently, such OPO systems are complex, large, and intrinsically very sensitive to the environmental conditions (non-robust). Furthermore, wavelength tuning of such a system requires mechanical movement of the tuning elements such as rotation or translation of a nonlinear crystal, rotation of cavity mirrors, etc., which is incompatible with fast wavelength tuning or switching. Therefore, OPOs can not serve as practical ultrashort-pulse sources for producing multiple-wavelength pulses directly with mode-locked oscillator output.

SUMMARY OF THE INVENTION

It is a general object of the present invention to provide a method and apparatus for generating ultrashort optical pulses at a variable or adjustable optical wavelength from a single source which provides ultrashort optical pulses at a fixed optical wavelength.

It is a further object of the present invention to provide a method and apparatus for generating ultrashort optical pulses at a plurality of optical wavelengths using a single source which provides ultrashort pulses at a fixed optical wavelength.

Another object of the present invention is to provide fast control of the output of a laser system in order to select between a plurality of wavelength conversion channels.

Still another object of the present invention is to provide a plurality of wavelengths at the single output of a laser system by combining outputs from separate wavelength-conversion channels into a single output beam.

Yet another object of the present invention is to enable efficient multiple-wavelength or adjustable-wavelength operation at relatively low pulse energies and powers which are compatible with existing ultrashort-pulse laser oscillators. An additional object of the present invention is to implement such a system using components which are robust, compact and well-suited for large-volume fabrication in order to provide a compact, robust, easily manufacturable and cost-effective apparatus.

The aforesaid objects are achieved individually and in combination, and it is not intended that the present invention be construed as requiring two or more of the objects to be combined unless expressly required by the claims attached hereto.

In accordance with the present invention, these objects are achieved in a system having a first part comprising a laser system for producing ultrashort pulses at a fixed wavelength, and a second part comprising at least one and preferably a plurality of wavelength-conversion channels. A wavelength-controlling element (or elements) is disposed between the laser generator and the wavelength-conversion channels, which element(s) directs the pulses from the laser generator into at least one of the wavelength conversion channels. Another component or plurality of components is disposed downstream of the wavelength-conversion channels and serves to combine outputs from separate wavelength-conversion channels into a single output channel.

According to the present invention, novel optical waveguide devices are used for the wavelength-conversion channels, wavelength-control and beam-control elements. Preferably, a fiber laser system is used for generating single-wavelength, ultrashort pulses. The multiple-wavelength laser system of the present invention advantageously replaces a plurality of different, single-wavelength laser systems.

One application for the present invention is in systems that require ultrashort optical pulses at wavelengths that are different from the wavelength of the pulse-generating laser. For example, the system of the present invention can shift the ultrashort pulse wavelength to approximately 1.3 μm for optical coherence tomography (OCT), where tissues are most transparent.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

All of the above-referenced articles are incorporated herein by reference in their entirety.

BRIEF DESCRIPTION OF THE DRAWINGS

FIG. 14 is a diagrammatic view of an optical split switch matrix (OSSM) for selectively distributing ultrashort pulses into three wavelength conversion channels using an electro-optic device.

DESCRIPTION OF THE PREFERRED EMBODIMENTS

Figure 1:
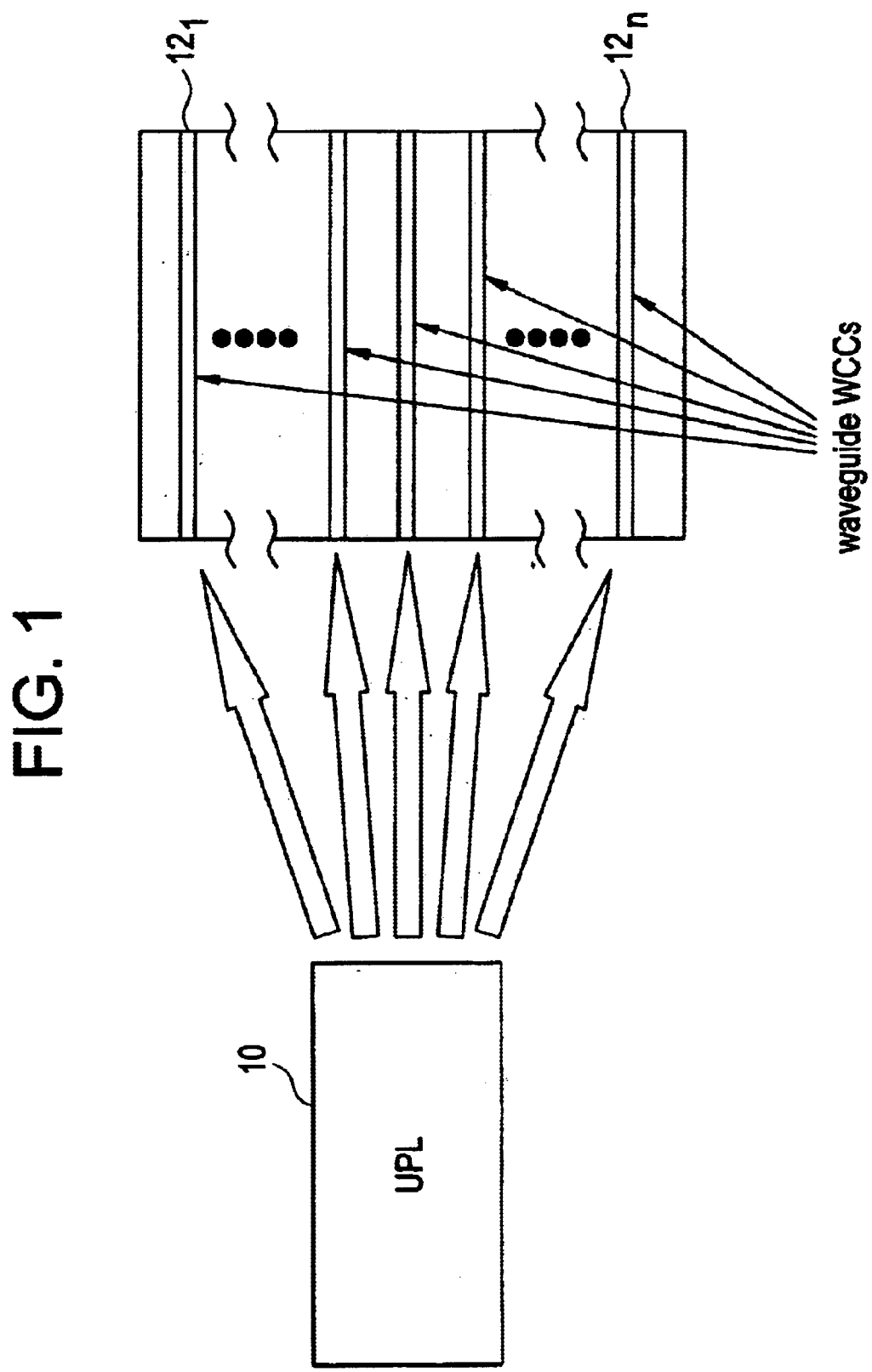
FIG. 1 is a diagrammatic view of an ultrashort-pulse laser source according to the present invention.

FIG. 1 is a top-level diagram illustrating a system for providing ultrashort pulses with an adjustable or variable optical wavelength or a plurality of wavelengths according to the present invention. The system includes an ultrashort pulse laser (UPL) 10 for producing ultrashort optical pulses at a fixed wavelength, and at least one wavelength-conversion channel (WCC) $12_1$–$12_n$.

UPL 10 can be a mode-locked fiber oscillator which can provide picosecond or femtosecond optical pulses with typical pulse energies between 10 pJ ($10 \times 10^{-12}$ J) to 10 nJ ($10 \times 10^{-9}$ J) and typical average powers between 0.1 mw to 100 mw. The mode-locked fiber oscillator can have any of a variety of possible designs, such as those described in the above-referenced articles by Fermann et al. It is preferable, for the reasons outlined above, that the fiber oscillator have an all-fiber cavity without any non-fiber dispersion-controlling elements. Consequently, the preferable operation wavelength is 1.55 μm. Alternatively, UPL 10 can be a solid-state laser, such as a Ti:sapphire laser, a Cr:Forsterite laser, a Cr:LiSaF laser or a Cr:LiSGaF laser.

One important feature of the embodiment illustrated in FIG. 1 is that the wavelength conversion in the WCCs is obtained in an optical waveguide. As explained above, use of a nonlinear conversion in the volume of currently known nonlinear materials does not allow optical parametric generation to be achieved using unamplified output from a mode-locked fiber laser or, in general, from any other existing mode-locked ultrashort-pulse laser. It has been experimentally demonstrated for the first time that, by using optical parametric generation in specially designed waveguides in periodically-poled lithium niobate (LiNbO$_3$), the OPG threshold can be lowered into the energy range accessible with ultrashort-pulse oscillators.

An essential difference between parametric generation in a bulk crystal and in an optical waveguide is that the latter allows the optical beam to be confined to a small cross-sectional area and allows the optical beam to propagate along the whole waveguide length without diffraction spreading. In contrast, propagation of a free-space beam in a volume of an optical crystal results in diffraction spreading. Consequently, a significantly higher optical intensity over a long propagation length in an optical waveguide results in significantly higher optical parametric gain compared to bulk crystal for the same optical pump power.

Furthermore, maximum interaction length between two or more ultrashort pulses is limited due to different group-velocities at different optical wavelengths. This maximum, walk-off limited length $t_{walk-off}$ is determined by the duration of the pulse $\Delta\tau$ and the group-velocity mismatch (GVM) parameter $\upsilon_{GVM}$ of an optical material: $t_{walk-off} = \Delta\tau/\upsilon_{GVM}$.

Quantitatively, the advantage of OPG in an optical waveguide compared to the confocally focused beam in the bulk of the same nonlinear material (at the degeneracy) can be expressed by the following formula:

$$\frac{P_{thconf}}{P_{thwaveg}} = \frac{\lambda l_{walkoff}}{2n A_{waveg}}$$

Here, $P_{thconf}$ and $P_{thwaveg}$, are threshold peak-powers for pump pulses in a bulk crystal and in a waveguide, respectively, $\lambda$ and n are signal wavelength and refractive index at the degeneracy point, and $A_{waveg}$, is the waveguide cross-sectional area. Higher threshold peak-power requires higher pump pulse energies. Therefore, the advantage of using an optical waveguide compared to a bulk crystal is inversely proportional to the pulse duration. Note that, for a bulk material, OPG threshold is independent of the pulse duration.

As described above, the lowest OPG threshold in bulk crystal has been achieved in a periodically-poled lithium niobate (PPLN). Therefore, the preferable material for a parametric waveguide is PPLN, although periodically-poled ferroelectric optical materials such as PP lithium tantalate, PP MgO:LiNbO$_3$, PP KTP, or other periodically poled crystals of the KTP isomorph family can also be advantageously used. The optical waveguides are preferably fabricated in a PPLN substrate using known titanium indiffusion (TI) or proton-exchange (PE) (or a combination of titanium indiffusion and proton-exchange (TIPE)) techniques.

Figure 2:
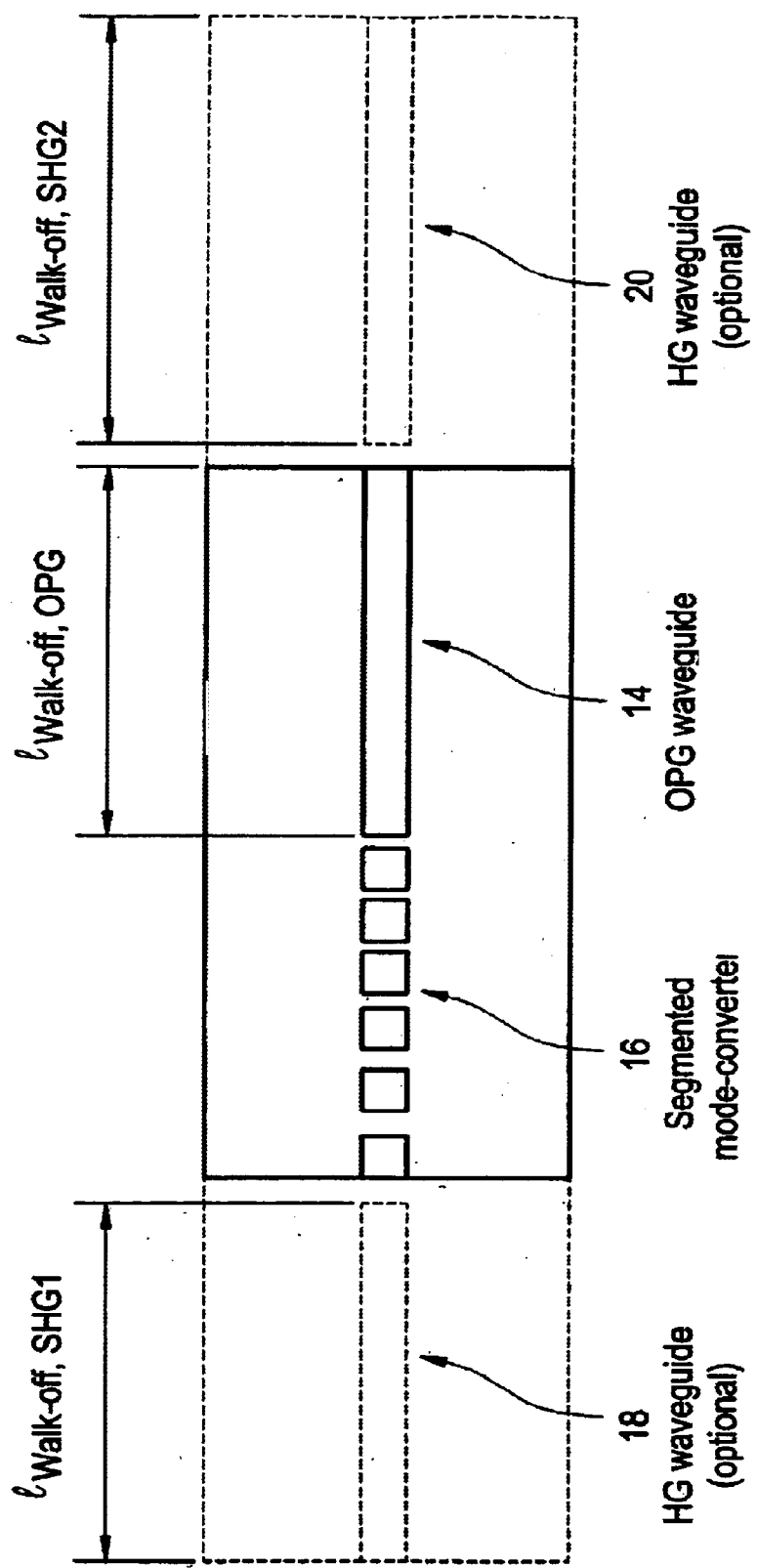
FIG. 2 is a diagrammatic view of a preferred waveguide structure for the wavelength conversion channels of the present invention.

FIG. 2 illustrates a preferred waveguide structure for the WCCs of the present invention. The optical parametric generation (OPG) stage 14 is preceded by an adiabatically tapered waveguide mode-converter structure 16, which may be implemented with a segmented waveguide. The mode-converter 16 can have a design similar to that described by Chou et al. in "Adiabatically tapered periodic segmentation of channel waveguides for mode-size transformation and fundamental mode excitation"; Optics Letters, Vol. 21, No. 11; June, 1996, incorporated herein by reference in its entirety. Use of the mode converter 16 is advantageous, since the OPG waveguide is single-mode at the longer, parametrical signal wavelength (in this particular embodiment, at ~1.55 $\mu$m) but is multi-mode at the shorter, pump wavelength (in this particular embodiment, at 780 nm). Therefore, it is difficult to excite a single, fundamental mode at the pump wavelength in such a waveguide by a direct coupling of a pump into the waveguide. Best performance, in terms of threshold, stability and conversion efficiency can be achieved when the pump is coupled into this mode-converter port 16 first, where it is converted into a fundamental mode, and then launched into the OPG section 14 in a fundamental transversal mode.

Figure 3:
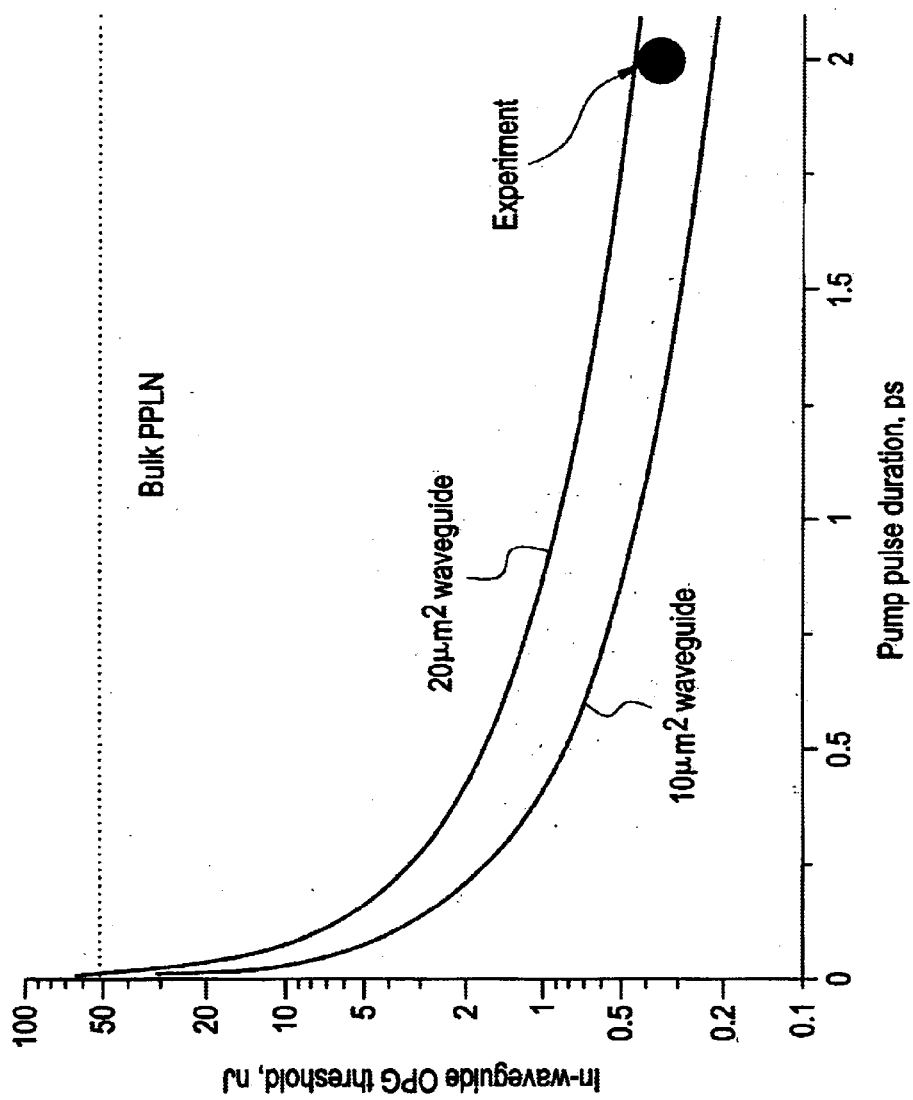
FIG. 3 is a graph illustrating the theoretical optical parametric generation (OPG) threshold-energy dependence on the pump pulse (in-waveguide) duration for bulk and waveguide structures in periodically-poled lithium niobate (PPLN).

FIG. 3 illustrates the theoretical OPG threshold-energy dependence on the pump pulse (in-waveguide) duration for bulk (dotted line) and waveguide (solid line) structures in PPLN. The OPG threshold energy is calculated using the above formula and the measured 50 nJ OPG energy-threshold for bulk PPLN. The experimental energy-threshold value measured for 2 ps long pump pulses is ~340 pJ, as shown in FIG. 3 by a bullet. The threshold level constitutes a reduction of approximately two-orders of magnitude for this particular pulse duration and thus demonstrates that OPG can be achieved with picosecond and subpicosecond pulse durations essentially in the energy range accessible with mode-locked lasers. One example of such a fiber oscillator is given in the above-mentioned article by Fermann et al. (Electronics Letters, Vol. 31, No. 3), providing 6–10 nJ pulses for 2–4 ps duration, which are sufficient to directly drive the waveguide OPG wavelength conversion channels of the present invention.

Figure 4:
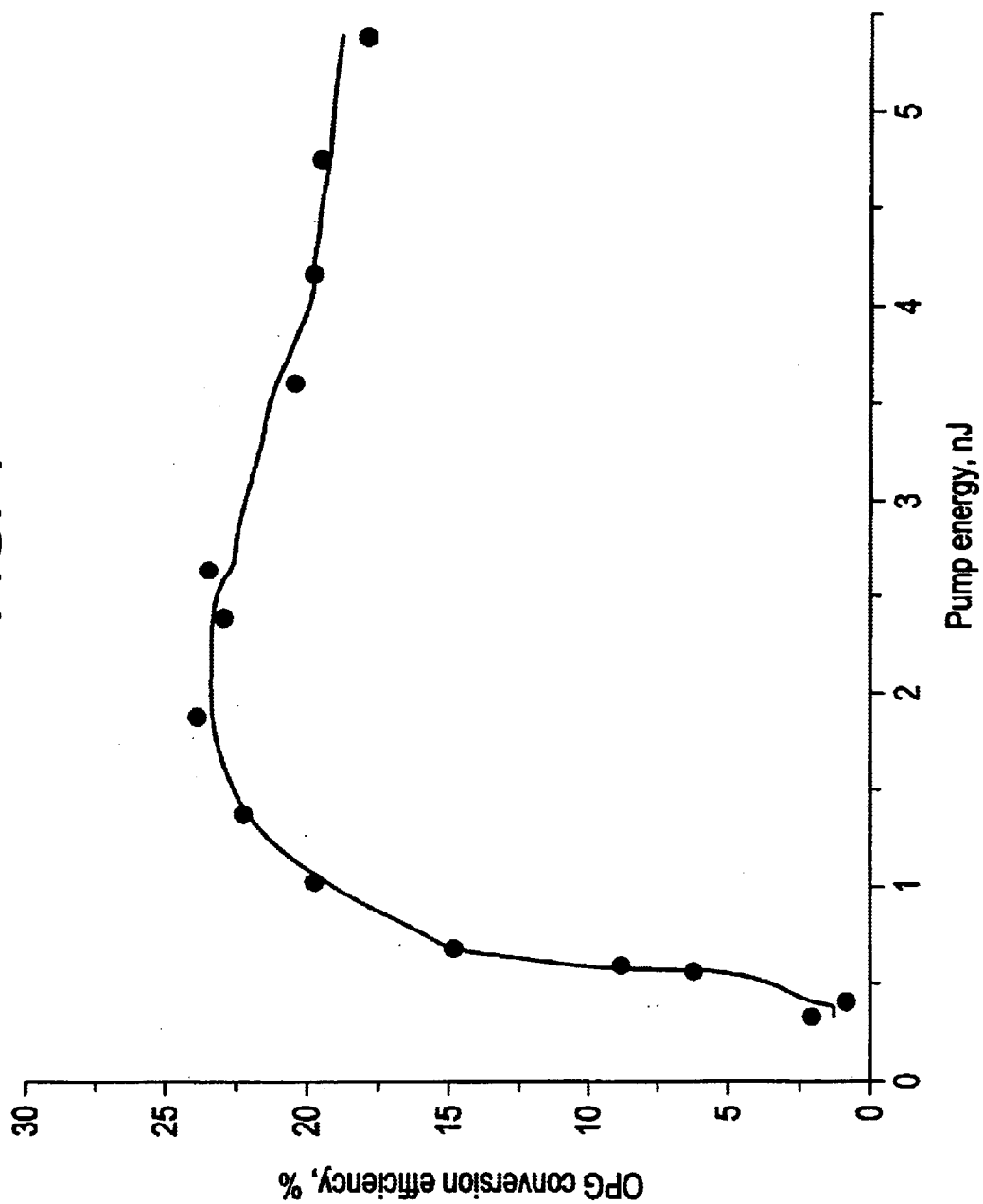
FIG. 4 is a graph illustrating the measured optical parametric generation (OPG) conversion efficiency as a function of pump energy according to the present invention.

As illustrated graphically in FIG. 4, efficient energy conversion can be achieved with this structure. Maximum conversion efficiencies of ~25% have been reached for pump energies at approximately 4–5 times the OPG threshold.

Figure 5:
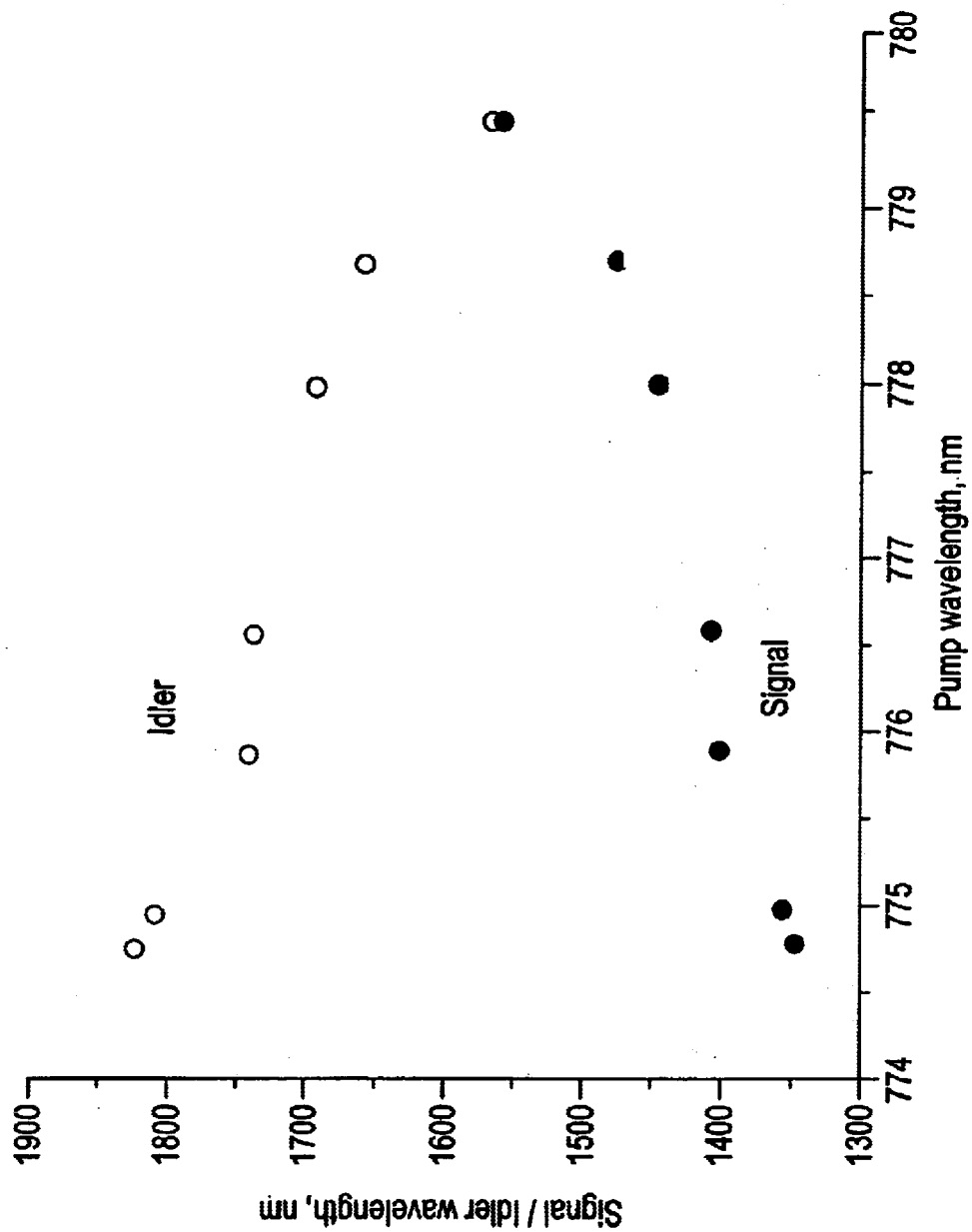
FIG. 5 is a graph illustrating the measured signal and idler wavelengths versus pump wavelength at 100° C.

The converted optical wavelength can be adjusted by adjusting the temperature of the waveguide (i.e., by controlling the temperature of substrates in which the waveguide is formed) thus accessing a plurality of optical wavelengths with a single waveguide. The OPG 14 is capable of simultaneously producing two different optical wavelengths, the shorter of which is called "signal" and the longer of which is called "idler". Therefore, a single WCC is suitable for generating two required optical wavelengths by properly choosing the pump wavelength and the periodic-poling period such as to satisfy energy-conservation and momentum conservation laws for all three (pump, signal and idler) optical wavelengths. As an example, FIG. 5 illustrates the measured signal and idler wavelengths versus pump wavelength at temperature of 100° C. and a quasi-phase-matched (QPM) grating period of 15 $\mu$m.

Furthermore, multiple-wavelengths can be accessed with a single chip containing a plurality of waveguides with different electrically-poled periods, as shown in FIG. 1. Each predesigned wavelength can be accessed by translating the crystal in the transversal direction to select the required waveguide.

In accordance with the present invention, each WCC optionally includes at least one harmonic generator HG 18 before the OPG stage 14 and at least one harmonic generator HG 20 after the PG stage 14. Generally, this allows generation of optical wavelengths shorter than the mode-locked laser wavelength. All waveguides can be manufactured on a single chip thus simplifying the system and eliminating additional in-waveguide coupling losses. If a free-space pump is first coupled into a waveguide harmonic-generator which is a single-mode at this initial wavelength, e.g., at 1550 nm, then the wavelength-converted beam at a shorter wavelength, in general, will be obtained in a fundamental mode and can be directly launched into the OPG stage (on the same chip). Thus, the second harmonic generator performs the function of the mode conversion. Adiabatically tapered mode converters then may not be necessary.

Figure 6:
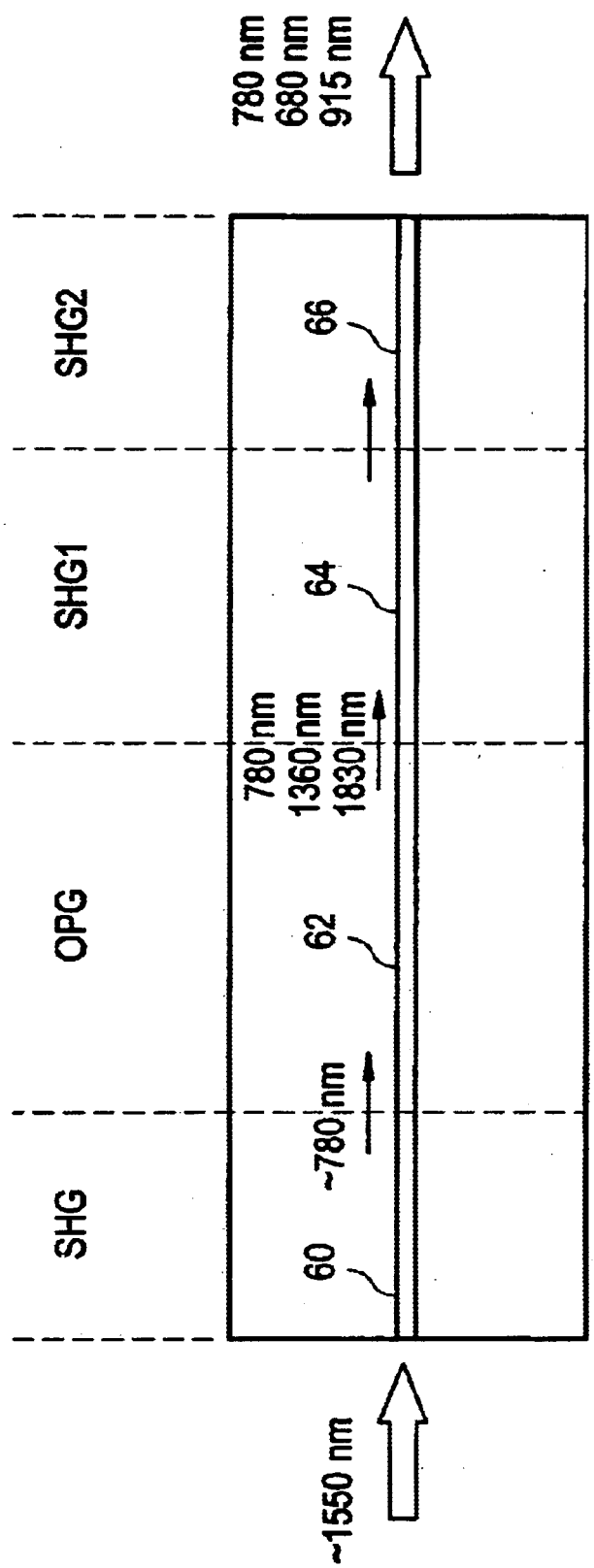
FIG. 6 is a diagrammatic view of multiple-wavelength output using a single waveguide in accordance with the present invention.

An example of a configuration with a multiple-wavelength output using a single waveguide as a wavelength conversion channel is shown in FIG. 6. Ultrashort pulses having a single wavelength, e.g., ~1550 nm pulses from a fiber-laser, are launched into the waveguide, and a specific set of ultrashort-pulse wavelengths, e.g., ~680 nm, ~780 nm and ~915 nm are generated within the waveguide and provided at an output thereof. Specifically, the 1550 nm pulses are launched into a waveguide, the first section of which constitutes a second-harmonic generator 60, implemented through the correct PPLN period (which should be designed taking into account the exact geometry of the waveguide) and the temperature of the waveguide substrate. The waveguide can have the same width throughout all sections, provided that the 1.55 μm input is single-mode. Then, the generated second-harmonic is in the fundamental mode. The doubled output of the fiber laser at ~780 nm is further transmitted into the OPG section 62 of the waveguide to simultaneously generate ~1360 nm as the signal wavelength, and ~1830 nm as the idler wavelength. The specified wavelengths can be obtained through a certain PPLN period used for the OPG section, according the factors described above. These two generated signal and idler wavelengths can be separately doubled in further sections of the waveguide to provide 680 nm and 915 nm wavelength pulses, respectively. The remaining 780 nm pump is transmitted together with these two wavelengths to the output. The final stages of the device, containing harmonic generators 64 and 66 for OPG output can be implemented on the same substrate, separately on a different substrate or substrates or even using bulk material.

Figure 7:
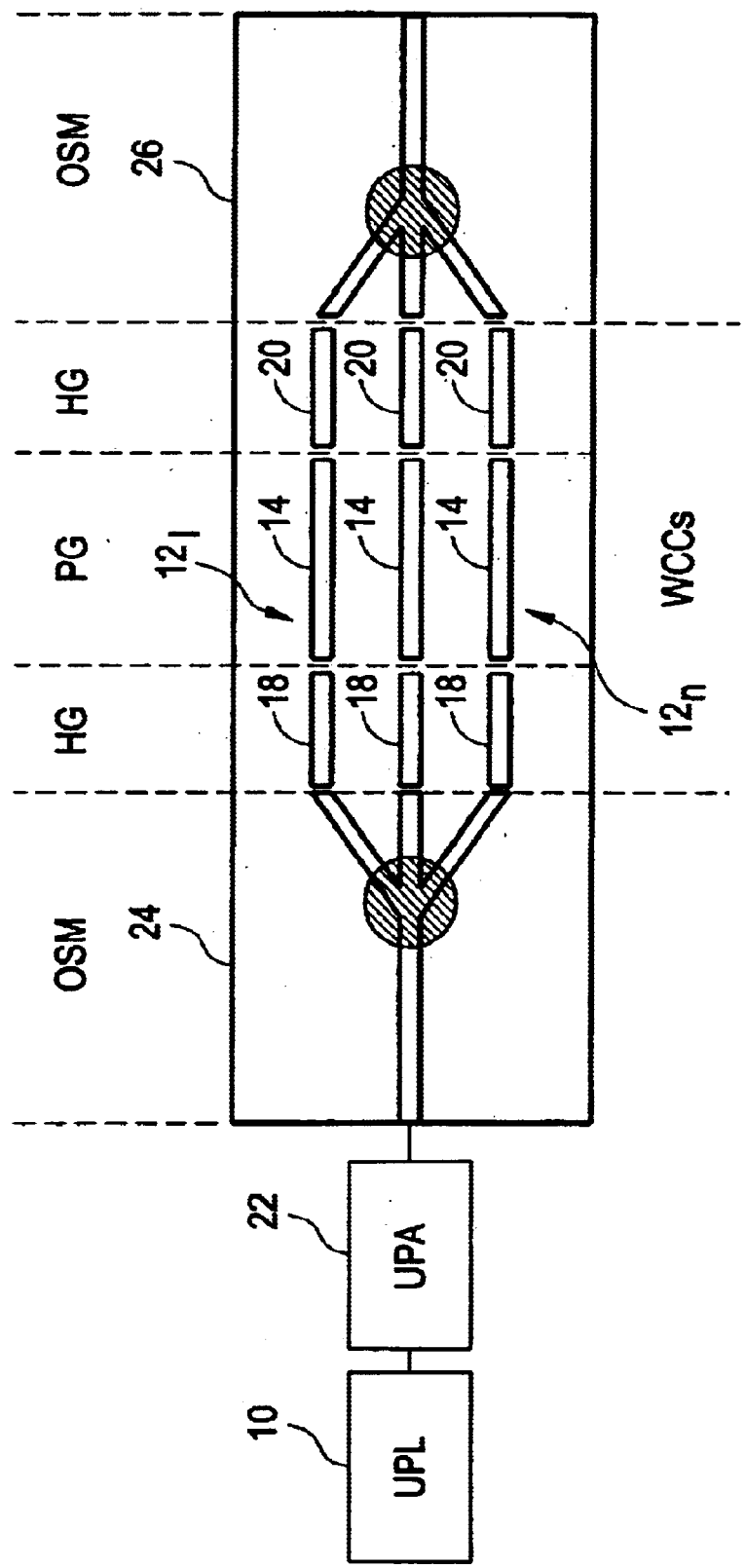
FIG. 7 is a diagrammatic view of a multiple-wavelength, ultrashort-pulse generating system according to the present invention.

A general embodiment of a multiple-wavelength, ultrashort-pulse generating system according to the present invention is shown in FIG. 7. The system for generating and controlling a multiple-wavelength ultrashort-pulse output includes an ultrashort pulse laser (UPL) 10 for producing ultrashort optical pulses at a fixed wavelength, an optional ultrashort-pulse amplifier (UPA) 22 for increasing power and energy of the ultrashort pulses from UPL 10, an optical split switch matrix (OSSM) 24 for distributing ultrashort pulses into a plurality of wavelength-conversion channels, at least one and preferably a plurality of wavelength-conversion channels (WCCs) $12_1$ to $12_n$, each of which includes a parametric-generation stage (PG) 14 and optional harmonic generation (HG) stages 18 and 20, and an optical combining switch matrix OCSM 26 at the output of the system to combine output ports of a plurality of WCCs to provide a single output beam (the OSSM and OCSM are not necessary if only one WCC is present).

If the pulse energy directly produced by a mode-locked fiber oscillator is insufficient for driving the waveguide-WCCs, the laser output can be amplified in an ultrashort-pulse amplifier UPA 22. Preferably, such amplifier is a fiber amplifier. Very importantly, the low energy required to operate the waveguide-WCCs allows one to use a relatively simple fiber amplifier design. Pulses in the 1–10 nJ range and higher can be obtained either directly or by using compact and simple chirped-pulse amplification schemes based on chirped fiber gratings or chirped-period poled lithium niobate compressors C-PPLN, as described by Galvanauskas et al. in "Use of Chirped-Period-Poled Lithium Niobate for Chirped Pulse Amplification in Optics Fibers"; Ultrafast Optics '97, Monterey Calif.; August, 1997, incorporated herein by reference in its entirety.

Figure 8:
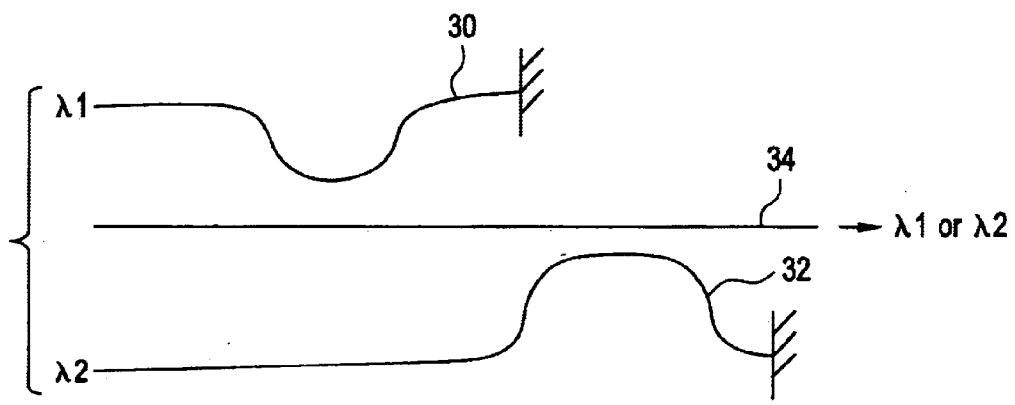
FIGS. 8–10 are diagrammatic views of an optical combining switch matrix, formed in a surface of a substrate, for switching pulses in one or both of two waveguides into an output waveguide.

The optical combining switch matrix (OCSM) 26 is capable of selecting a particular laser source from a plurality of WCCs. A conceptual plan view of a basic OCSM formed in a surface of a ferroelectric (e.g., PPLN) substrate is illustrated in FIG. 8. The basic OCSM is capable of switching pulses of wavelength $\lambda_1$ from waveguide 30 and/or pulses of wavelength $\lambda_2$ from waveguide 32 into a main trunk (output) waveguide 34. As explained above, the substrate is preferably made of a ferroelectric material such as lithium niobate or lithium tantalate. The optical waveguides are fabricated using titanium indiffusion (TI) or proton-exchange (PE) or a combination of titanium indiffusion and proton-exchange (TIPE). The optical switches are fabricated by bringing certain regions of the two optical waveguides sufficiently close together that the laser light can be switch from one waveguide to another.

Figure 9:
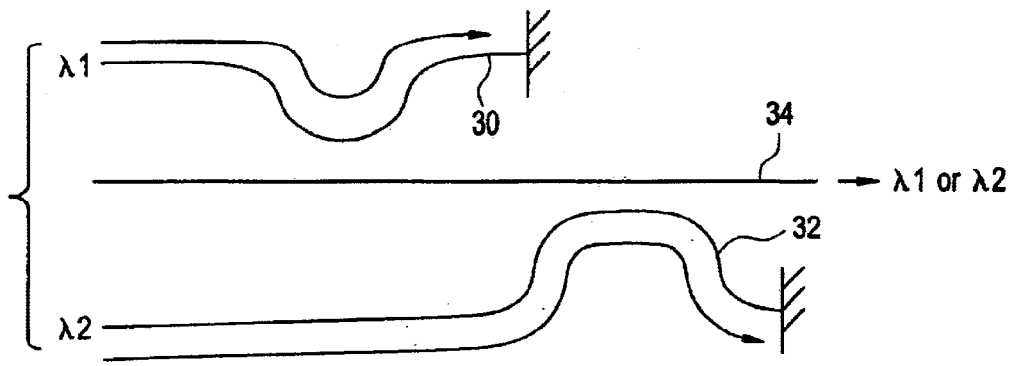
Figure 10:
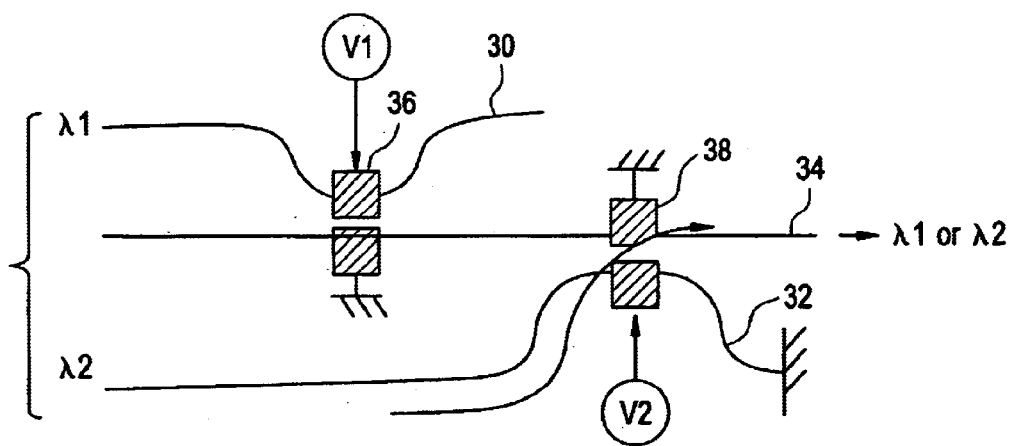

As shown in FIG. 9, in the absence of an external electric field, ultrashort pulses in waveguides 30 and 32 will not be switched to the main trunk waveguide 34 and will continue to propagate in waveguides 30 and 32 to optically terminated ports. The application of specific electrical voltages will cause the complete coupling of the ultrashort pulses in waveguide 30 and/or waveguide 32 into the main trunk waveguide 34. For example, as shown in FIG. 10, the ultrashort light pulses in waveguide 32 are coupled into the main trunk waveguide 34 by application of voltage V2 across the gap between the two waveguides. Optical directional couplers 36 and 38, such as those described in "Introduction to Optical Electronics", Amnon Yariv, pp. 391–395, Holt, Rinehart and Winston, 1976, incorporated herein by reference in its entirety, can be used to apply the respective electric fields between waveguides 30 and 32 and main trunk waveguide 34. The main trunk waveguide 34 is preferably fabricated using only the TIPE process. This allows the various ultrashort pulses to propagate relatively efficiently through the main trunk waveguide 34 and hence will provide a common port for all the WCCs.

Figure 11:
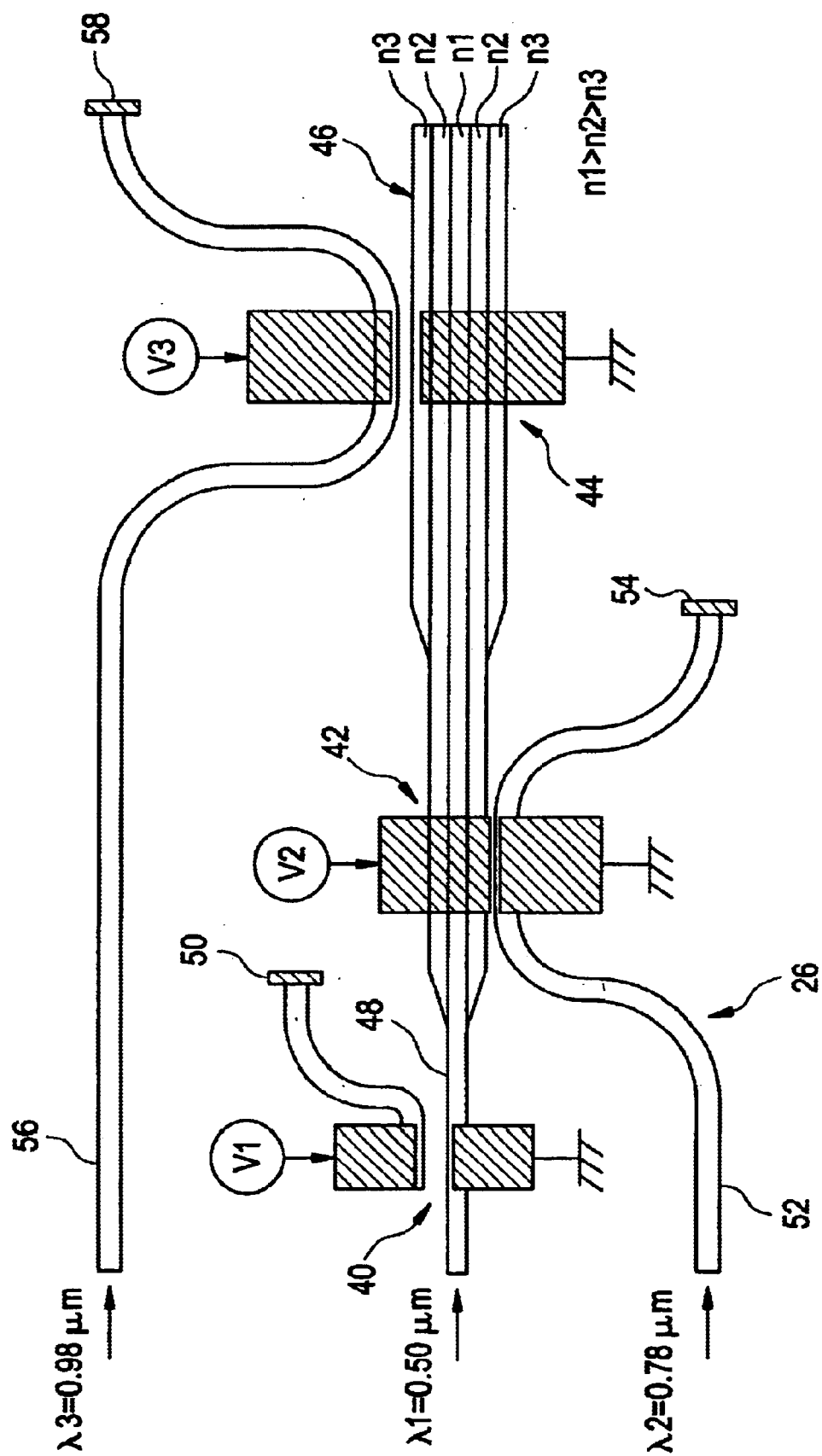
FIG. 11 is a diagrammatic view of an optical combining switch matrix (OCSM) capable of combining ultrashort optical pulses traveling in three wavelength conversion channel waveguides into a single output waveguide.

FIG. 11 is a diagrammatic plan view of the OCSM 26 shown in FIG. 7. FIG. 11 shows an OCSM capable of handling three WCCs, although the OCSM can be designed to handle any number of WCCs in accordance with the principles illustrated in FIG. 11. The OCSM 26 comprises three optical directional couplers 40, 42 and 44 fabricated in a ferroelectric material. The main optical waveguides 48, 52 and 56 of three WCCs are fabricated using TI. The waveguide 48 of a first WCC propagating 500 nm ultrashort pulses forms the center input waveguide with a refractive index of n1. In the off state (zero applied voltage), the 500 nm ultrashort pulses continue to propagate in waveguide 48 (which become the center portion of output waveguide 46). By application of a voltage V1, the 500 nm ultrashort pulses are switched to a laser dump port 50 and absorbed. Within the output waveguide 46, the 500 nm pulses tend to propagate primarily within the region having the n1 refractive index, thereby preserving a high degree of single mode operation.

A second WCC waveguide 52 providing 780 nm wavelength pulses is coupled to the output waveguide 46 by the second hybrid optical directional coupler 42. In the off state, the 780 nm ultrashort pulses are dumped into an optically terminated port 54. By application of an electrical voltage V2, the 780 nm ultrashort pulses can be switched to the output waveguide 46 with the hybrid TIPE waveguide of refractive index n2. The 780 nm pulses propagate primarily within the portion of the output waveguide having n1 and n2 indices of refraction, thereby preserving a high degree of single mode operation (i.e., the combined cross-sectional area of the n1 and n2 regions is consistent with single mode propagation for 780 nm ultrashort pulses).

The OCSM 26 further comprises another hybrid optical directional coupler 44 and an additional TIPE waveguide section of the output waveguide 46 with refractive index n3, where n1>n2>n3. The role of this additional TIPE waveguide section is to enable the propagation of the 980 nm wavelength pulses within the output waveguide 46. Specifically, the 980 nm pulses propagate primarily across the n1, n2 and n3 regions, where the combined cross-sectional area of the n1, n2 and n3 regions is consistent with single mode propagation for 980 nm ultrashort pulses. If zero voltage is applied to the third directional coupler 44, the 980 nm ultrashort pulses propagating in waveguide 56 are dumped in the termination port 58. By applying an electrical voltage of V3 to the hybrid optical directional coupler, the 980 nm wavelength pulses are guided in the common hybrid output port 46.

Although, for convenience, the output waveguide 46 is shown in FIG. 11 as having separate regions of n1, n2 and n3 refractive indices, it will be understood that the refractive index changes gradually over the width of the output waveguide 46, i.e., there is no refractive index "step" between regions n1 and n2 and between regions n2 and n3. Further, it will be understood that the n1, n2 and n3 regions are side-by-side in the substrate, e.g., the two n2 regions need not be a single region extending below and around the n1 region.

The optical directional couplers are preferably hybrid, because the TIPE waveguide technology is used here. The use of TIPE waveguides assists in the ability to combine all three wavelength sources to exit from the substrate through a common port and all wavelengths can remain in quasi-single mode operation. As can be seen, significant complication is added to the device so that the multiple wavelengths can propagate down a single waveguide and still be single mode. If the wavelengths are close enough together, a single waveguide will be single mode for each.

The OCSM 26 shown in FIG. 11 can be extended to combine any number of WCCs limited only by the size of the substrate material. With the availability of 4" lithium niobate wafer material, it is possible to combine up to ten different WCCs. The design of the various TIPE waveguide sections is more critical with greater numbers of WCCs.

The above description relates to combining of signal pulses received in each of the WCCs. The same principle can be extended to switching of the idler signal in each of the WCCs as well.

It should be noted that, as an alternative to the above-described novel OSCM 26, the combining function can be performed using conventional devices which are external to the integrated optical chip. For example, there are a number of known means for combining multiple wavelengths into a common path. These means have been used in WDM systems. The simplest means is a series of dichroic mirrors. Another approach is to use a fiber WDM. In general, the OSCM 26 of the present invention can employ any method used in WDM systems for combining different wavelengths.

Figure 12:
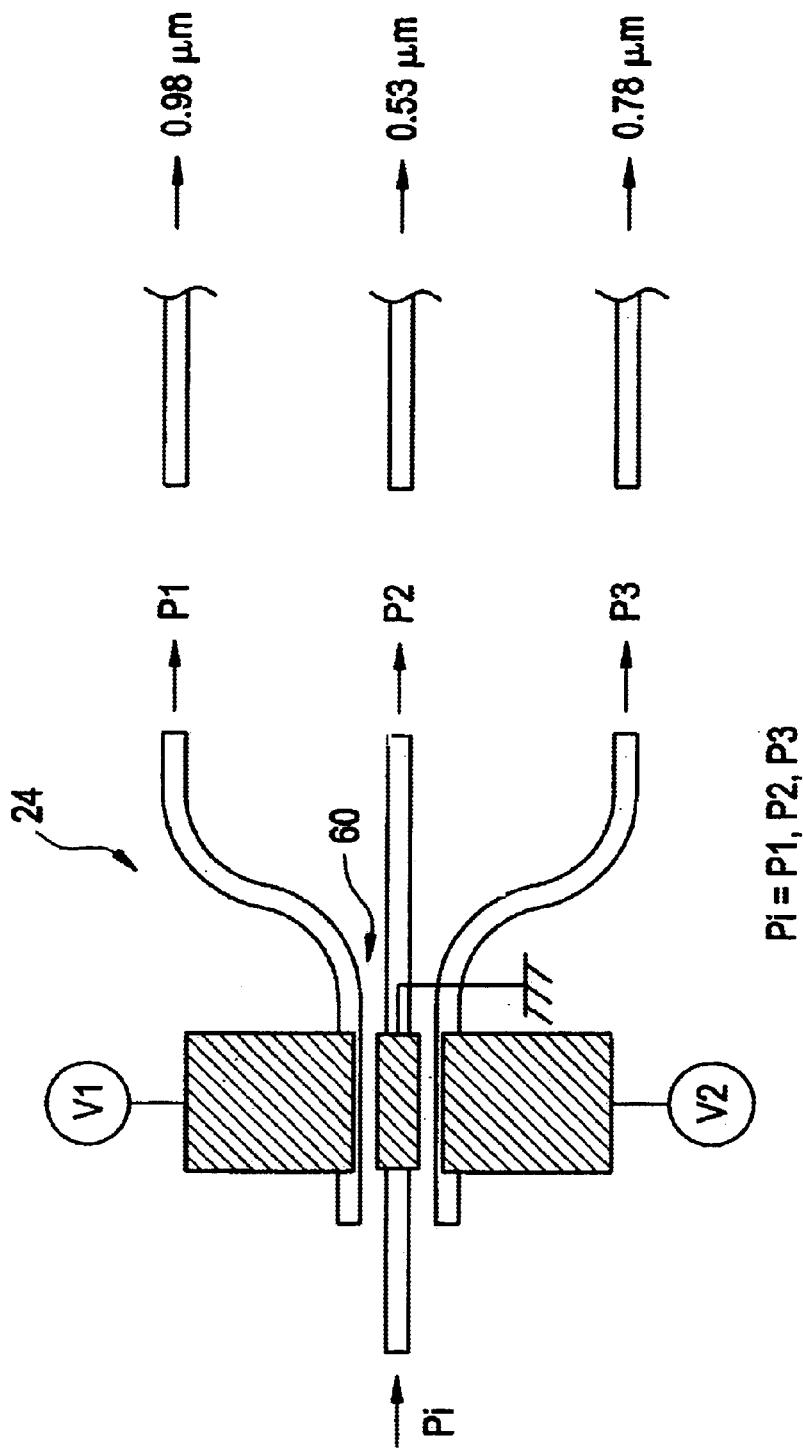
FIG. 12 is a diagrammatic view of an optical split switch matrix (OSSM) for selectively distributing ultrashort pulses into three wavelength conversion channels from one, single-wavelength pulse source.

The structure of optical split switch matrix (OSSM) 24 of FIG. 7 is shown generically in FIG. 12. The OSSM 24 directly feeds ultrashort pulses (e.g., 1.55 μm) from UPL 10 into any one or several of the WCCs. The control of the ultrashort pulses from the input port of the OSSM 24 to any of the WCCs is accomplished using either an electro-optic or the acousto-optic method, as described hereinbelow.

FIG. 12 illustrates the use of 1×3 optical directional couplers 60 to distribute the input radiation to any or all of the output ports. The 1.55 μm wavelength pulses are fed into an optical waveguide fabricated by TI or PE or TIPE on a ferroelectric substrate such as lithium niobate or lithium tantalate. All the waveguides have the same width cross-sectional area which is designed for single-mode propagation at the source wavelength. The condition of the splitting action is governed by applying voltages V1 or V2 to the 1×3 optical directional couplers 60. Appropriate mode converters 16 can used in WCCs to ensure optimized device operations, i.e., minimum excess loss and high interaction efficiency in the WCCs (see FIG. 2). The switching voltage applied to the 1×3 OSSM can be synchronized to the switching of the OCSM 26 described above. The OSSM 24 shown in FIG. 12 can be realized using electro-acoustic or electro-optical active switches. It is also possible to use guided-wave optical gratings to realize the above OSSM.

Figure 13:
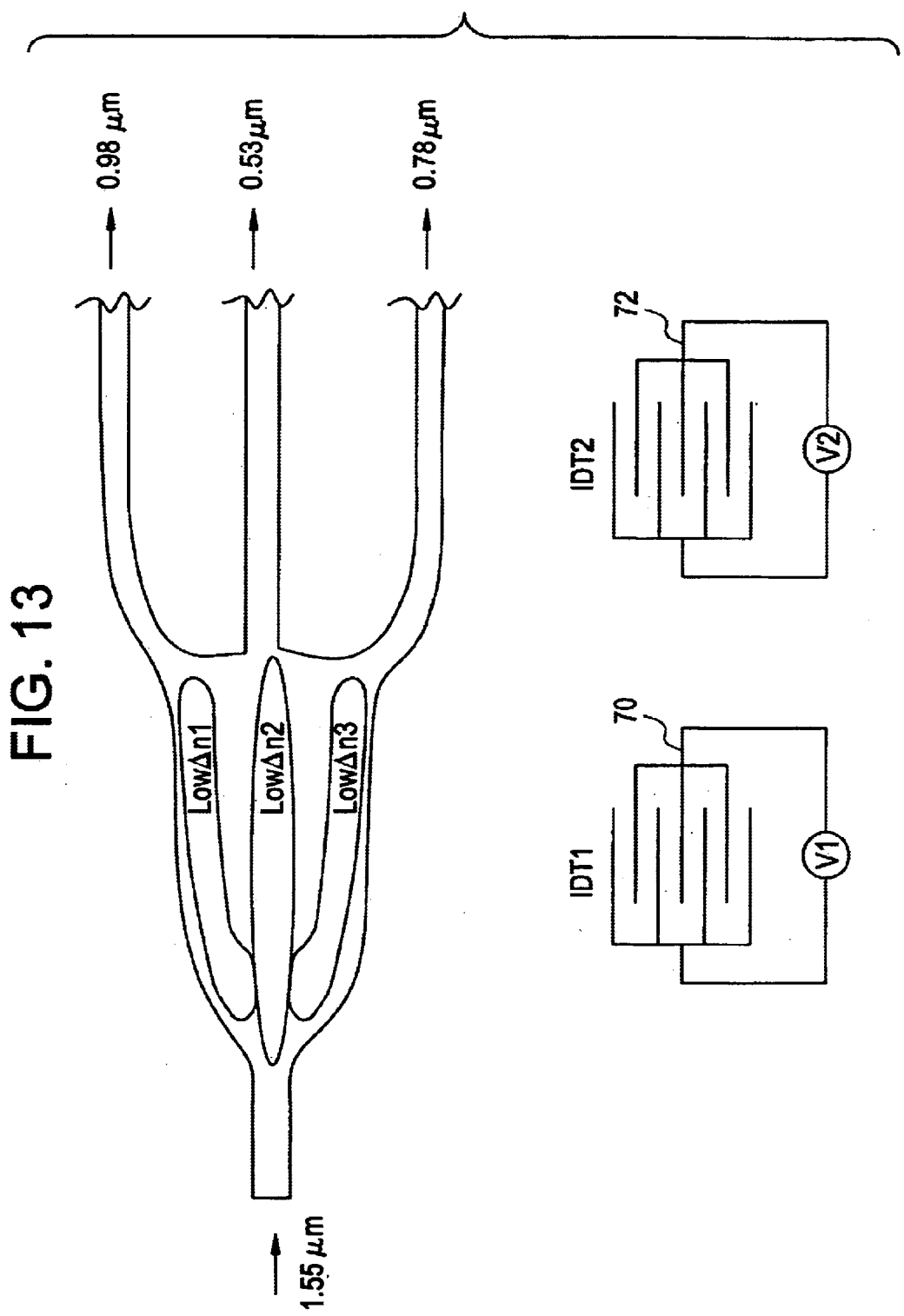
FIG. 13 is a diagrammatic view of an optical split switch matrix (OSSM) for selectively distributing ultrashort pulses into three wavelength conversion channels using an acousto-optic device.

FIG. 13 illustrates a novel implementation of a 1×3 OSSM based on surface acoustic waves (SAWs) generated by the interdigital transducers IDT1 70 and IDT2 72. As shown in FIG. 13, IDT1 70 and IDT2 72 are disposed on the substrate surface. The optical waveguide regions marked with Δn1, Δn2, and Δn3 are of slightly higher index than the base 1×3 optical waveguide structure. The substrate material is preferably ferroelectric with the waveguides being fabricated using TI. The slightly higher index waveguide regions are fabricated using PE. With proper annealing, the refractive index change can be minimized, as required by this configuration. When no electrical signals are applied to the interdigital electrode transducers, the path of the 1.55 μm laser light will propagate straight into the middle output port of the 1×3 OSSM. When a voltage V1 is applied to IDT1 70, the generated SAWs will deflect the 1.55 μm laser light into the first (e.g., upper) output port of the 1×3 structure. In the same manner, if a voltage V2 is applied to the IDT2 72, the 1.55 μm ultrashort pulse is deflected into the third (e.g., lower) output port of the 1×3 waveguide structure. The direction and amount of deflection of the input pulse depends both on the applied voltages and the Δn values. Placement of the IDTs on the surface of the substrate can be optimized to improve efficiency. Efficiencies greater than 90% can be realized with such a configuration. The insertion loss is minimized by the presence of the Δn structure.

For the equal distribution of the input laser radiation into all three output ports of the 1×3 OSSM, the Δn's of the three hybrid waveguide regions can be increased by shorter anneal times or longer PE times. In this mode of operation, both of the applied voltages V1 and V2 to the OSSM are required to optimize the equal splitting action.

Instead of using acousto-optic element for deflection of the input pulses, the switching action can be implemented using an electro-optic induced grating (EOG) by using a pair of grating metallic electrodes on the ferroelectric substrates. FIG. 14 shows a novel implementation of such a 1×3 OSSM. The 1×3 optical waveguide device and the presence of the three appropriate higher Δn regions are similar to those described in the acousto-optic based 1×3 OSSM shown in FIG. 13. By applying a voltage V1 to the EOG1 80, a periodic refractive index change is induced similar to that generated by an IDT in FIG. 13. The period of the metallic electro-optic induced grating structure is designed such that the 1.55 μm input pulse is switched to the first (e.g., upper)

output port of the 1×3 waveguide device. If no voltage is applied, the 1.55 μm input pulse will go directly into the middle port of the 1×3 OSSM device. If a voltage V2 is applied to the EOG2 82, the incoming 1.55 μm input pulse is switched appropriately to the third (e.g., lower) output port of the 1×3 device. The refractive index changes of the three hybrid waveguide structures in the 1×3 OSSM can be increased to allow for equal splitting of the incoming pump laser radiation into the three output ports. Both of the EOGs 80 and 82 are then used to optimize the splitting. The acousto-optic and electro-optic devices described here can be, for example, those used for switching in telecommunication circuits. Of course, other means of switching for integrated optical circuits for telecommunication applications can also be used.

As with the OCSM described above, the OSSM can be extended from a 1×3 to a 1×10 structure. Again, the critical limitation is the size of the ferroelectric wafer. The hybrid PE sections in the larger than 1×3 OSSM element can be realized by multiple PE processes to compensate for higher splitting losses at larger angular splits, as required by the overall OSSM, WCC and OCSM configuration. The OSSM 24, WCCs and OCSM 26 are preferably formed on a single substrate.

The specific configuration for the multi-wavelength source of the present invention is very much dependent on the application. With a multi-wavelength source in a system, one has a system with much expanded capability. One application for the multi-wavelength source is as an RGB source for commercial display or printing purposes. Specifically, an OPG waveguide device can be used to simultaneously or separately convert the ultrafast pulses to red, green, blue wavelengths. The integrated optics circuit of the type described above could also include this switching circuit to turn the colors on or off for the image formation. The ultrafast pulses have the advantage in that the efficient conversion obtained with high peak-power and large bandwidth at each color minimizes the speckle obtained from the laser (speckle makes the image appear grainy to the eye).

Optical coherence tomography (OCT) is being developed as a medical and ophthalmic imaging tool. It is capable of using light to image through human tissue which scatters light strongly. OCT has been demonstrated to give images with better resolution than other medical imaging techniques such as MRI, computerized tomography, or ultrasound. Axial resolution is 10 microns, and can be reduced to 2 microns when using a short coherence length light source such as a femtosecond laser. However, the depth of imaging is limited to about 3 mm. One desirable feature of OCT is that it can use a simple and cheap light source such as a superluminscent laser diode. However, better performance is obtained using a mode-locked laser. For example, in in vivo imaging of the heart of a frog embryo, it takes 20 seconds to acquire an image when using a superluminescent diode, but only 0.25 seconds when using a mode-locked laser, allowing researchers to capture the motion of the beating heart during diastolic and systolic phases. Rapid scanning (2000 Hz) can be employed to achieve this fast image acquisition. Both mode-locked Ti:sapphire and mode-locked Cr:Forsterite have been used for OCT. Cr:Forsterite is especially well suited for imaging in biological tissues because of its wavelength (1300 nm); scattering effects that limit imaging depth are reduced at longer wavelengths. Because the method is compatible with fiber technology, it has been successfully used for endoscopy. As reported by Tearney et al. in "Rapid acquisition of in vivo biological images by use of optical coherence tomography"; Optics Letters, Vol. 21, No. 17; September 1995, incorporated herein by reference in its entirety, a radially-scanning catheter-endoscope probe with rapid image acquisition has been demonstrated. OCT has been demonstrated in a number of clinical and research trials including: cancer detection in the human stomach wall; subsurface imaging and histology of the porcine esophagus wall; performing optical biopsy to replace excisional biopsy; and mapping blood flow velocities using Color Doppler OCT (CDOCT). Coupled with catheter, endoscopic, or laparoscopic delivery, OCT holds the promise of enabling the screening and diagnosis of a wide range of diseases including cancerous and precancerous tissue changes without the need for excisional biopsy and histological processing. In conjunction with conventional microscopy, OCT enables the imaging of internal structures in living specimens without the need for sacrifice and histology.

Therefore, for the purposes of OCT imaging in human tissue, a source lasing at 1.3 microns is desired. An erbium-doped fiber laser which is converted with an OPO waveguide device to 1.3 μm would be suitable for this application.

Having described preferred embodiments of a new and improved ultrashort pulse source with a controllable wavelength output, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An ultrashort pulse generator for generating ultrashort optical pulses, comprising:
    an ultrashort optical pulse source generating ultrashort optical pulses;
    a wavelength conversion channel for converting a wavelength of said ultrashort optical pulses to a different wavelength, comprising an optical waveguide including an optical parametric generation portion for parametrically generating said ultrashort optical pulses at said different wavelength; and
    a mode converter for coupling input light into said optical waveguide.

2. The ultrashort pulse generator as claimed in claim 1, wherein said mode converter comprises an adiabatically tapered waveguide.

3. The ultrashort pulse generator as claimed in claim 1, wherein said mode converter comprises a second harmonic generator located within said optical waveguide.

4. The ultrashort pulse generator according to claim 1, wherein said optical waveguide is formed in a substrate comprising a periodically-poled ferroelectric optical material.

5. The ultrashort pulse generator according to claim 4, wherein said periodically-poled ferroelectric optical material is one of: lithium niobate, lithium tantalate, MgO:LiNbO3, KTP and crystals of the KTP isomorph family.

6. The ultrashort pulse generator according to claim 1, wherein said wavelength conversion channel converts the wavelength of said ultrashort optical pulses as a function of at least one of: a temperature of the wavelength conversion channel; a wavelength of light pumped into said wavelength conversion channel; and a periodic-poling period of an electric field in said wavelength conversion channel.

7. The ultrashort pulse generator according to claim 1, wherein said ultrashort optical pulse source is a mode-locked fiber laser.

8. The ultrashort pulse generator according to claim 7, wherein said mode-locked fiber laser is an erbium-doped fiber laser.

9. The ultrashort pulse generator according to claim 1, wherein said ultrashort optical pulse source is one of: a Ti:sapphire laser, a Cr:Forsterite laser, a Cr:LiSaF laser and a Cr:LiSGaF laser.

10. The ultrashort pulse generator according to claim 1, wherein said wavelength conversion channel further comprises at least one harmonic generator for generating ultrashort optical pulses whose wavelength is shorter than the wavelength of the ultrashort optical pulses generated by said ultrashort optical pulse source.

11. The ultrashort pulse generator according to claim 1, further comprising an ultrashort-pulse amplifier upstream of said wavelength conversion channel for amplifying said ultrashort optical pulses.

12. The ultrashort pulse generator according to claim 11, wherein said ultrashort-pulse amplifier is an erbium fiber amplifier.

13. In combination:
a color image generating device; and
an ultrashort pulse generator for supplying image data to said color image generating device in the form of red, green and blue ultrashort optical pulses, said ultrashort pulse generator comprising: an ultrashort optical pulse source generating ultrashort optical pulses; a first wavelength conversion channel for converting a wavelength of said ultrashort optical pulses to produce red ultrashort optical pulses; a second wavelength conversion channel for converting the wavelength of said ultrashort optical pulses to produce blue ultrashort optical pulses; a third wavelength conversion channel for converting the wavelength of said ultrashort optical pulses to produce green ultrashort optical pulses.

14. The combination according to claim 13, wherein said first wavelength conversion channel includes an optical parametric generation portion which parametrically generates the red ultrashort optical pulses, said second wavelength conversion channel includes an optical parametric generation portion which parametrically generates the blue ultrashort optical pulses, and said third wavelength conversion channel includes an optical parametric generation portion which parametrically generates the green ultrashort optical pulses.

15. The combination according to claim 13, wherein each of said first, second and third wavelength conversion channels comprises a waveguide formed in a substrate comprising a periodically-poled ferroelectric optical material.

16. The combination according to claim 15, wherein said periodically-poled ferroelectric optical material is one of: lithium niobate, lithium tantalate, MgO:LiNbO3, and KTP and crystals of the KTP isomorph family.

17. The combination according to claim 13, wherein said ultrashort optical pulse source is a mode-locked laser.

18. The combination according to claim 13, wherein said ultrashort optical pulse source is one of: a Ti:sapphire laser, a Cr:Forsterite laser, a Cr:LiSaF laser and a Cr:LiSGaF laser.

19. The combination according to claim 13, wherein said ultrashort optical pulse source is a mode-locked fiber laser.

20. The combination according to claim 19, wherein said mode-locked fiber laser is an erbium-doped fiber laser.

21. In combination:
a color image generating device; and
an ultrashort pulse generator for supplying image data to said color image generating device in the form of red, green and blue ultrashort optical pulses, said ultrashort pulse generator comprising: an ultrashort optical pulse source generating ultrashort optical pulses; an optical pump for generating pump pulses at a pump wavelength; and an optical waveguide for converting a wavelength of said ultrashort optical pulses to red, green and blue wavelengths, said optical waveguide including: a first harmonic generation section responsive to said ultrashort optical pulses, for generating harmonic ultrashort optical pulses at a harmonic wavelength; an optical parametric generation section responsive to the harmonic ultrashort optical pulses and the pump pulses, for parametrically generating signal ultrashort optical pulses at a signal wavelength and idler ultrashort optical pulses at an idler wavelength; a second harmonic generation section responsive to the signal ultrashort optical pulses, for generating the blue ultrashort optical pulses; and a third harmonic generation section responsive to said idler ultrashort optical pulses, for generating the red ultrashort optical pulses, said optical waveguide transmitting the green ultrashort optical pulses at said pump wavelength.

22. The combination according to claim 21, wherein said optical waveguide is formed in a substrate comprising a periodically-poled ferroelectric optical material.

23. The combination according to claim 22, wherein said periodically-poled ferroelectric optical material is one of: lithium niobate, lithium tantalate, MgO:LiNbO3, and KTP and crystals of the KTP isomorph family.

24. The combination according to claim 21, wherein said ultrashort optical pulse source is a mode-locked laser.

25. The combination according to claim 21, wherein said ultrashort optical pulse source is one of: a Ti:sapphire laser, a Cr:Forsterite laser, a Cr:LiSaF laser and a Cr:LiSGaF laser.

26. The combination according to claim 21, wherein said ultrashort optical pulse source is a mode-locked fiber laser.

27. The combination according to claim 21, wherein said mode-locked fiber laser is an erbium-doped fiber laser.

28. An optical device, comprising:
an ultrashort-optical pulse source generating ultrashort optical pulses;
a wavelength conversion channel for converting a wavelength of said ultrashort optical pulses to a different wavelength, said conversion channel comprising an optical parametric generation portion having an optical parametric generation threshold energy in the picojoule regime for an ultrashort optical pulse duration in the low picosecond regime, and a mode converter for coupling input light into said optical parametric generation portion.

29. An optical device, comprising:
an ultrashort-optical pulse source generating ultrashort optical pulses; and
wavelength conversion device comprised of an optical parametric generation portion having an optical parametric generation threshold energy level of less than one nanojoule, and a mode converter for coupling input light into said optical parametric generation portion.

30. An optical wavelength conversion apparatus, comprising:
an optical pulse source generating optical pulses; and
a wavelength conversion channel for converting a wavelength of said optical pulses to a different wavelength, comprising an optical waveguide including an optical parametric generation portion for parametrically generating said optical pulses at said different wavelength, and a mode converter for coupling input light into said optical parametric generation portion.

31. An optical wavelength conversion apparatus, comprising:

a single laser source for generating optical pulses; and a wavelength conversion channel for converting a wavelength of said optical pulses to a different wavelength, comprising an optical waveguide including an optical parametric generation portion for parametrically generating said optical pulses at said different wavelength, and a mode converter for coupling input light into said optical parametric generation portion.

32. An optical wavelength conversion waveguide device, comprising:

an input end for receiving an optical signal at a first wavelength;

an optical parametric generator portion for parametrically generating an optical output at a second wavelength differing from said first wavelength; and a mode converter for coupling said optical signal into said input end, at least said optical parametric generator portion being comprised of a nonlinear medium.

33. An optical wavelength conversion waveguide device as claimed in claim 32, wherein said mode converter comprises a second harmonic generator.

34. An optical wavelength conversion waveguide device as claimed in claim 32, wherein the waveguide device lowers the OPG threshold by at least one order of magnitude as compared to a non-waveguide-form bulk device.

* * * * *